United States Patent
Dewitt et al.

(10) Patent No.: US 11,502,833 B2
(45) Date of Patent: *Nov. 15, 2022

(54) SECURE DATA HANDLING AND STORAGE

(71) Applicant: MX Technologies, Inc., Lehi, UT (US)

(72) Inventors: Brandon Dewitt, Bluffdale, UT (US); Matt Hillary, South Jordan, UT (US); Devin Christensen, Orem, UT (US); John Atkinson, Orem, UT (US); George Lambson, Eagle Mountain, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 266 days.

This patent is subject to a terminal disclaimer.

(21) Appl. No.: 16/726,118

(22) Filed: Dec. 23, 2019

(65) Prior Publication Data

US 2020/0136821 A1 Apr. 30, 2020

Related U.S. Application Data

(63) Continuation of application No. 15/420,026, filed on Jan. 30, 2017, now Pat. No. 10,516,530.
(Continued)

(51) Int. Cl.
*H04L 9/08* (2006.01)
*H04L 9/14* (2006.01)
*G06F 21/62* (2013.01)

(52) U.S. Cl.
CPC ........ *H04L 9/0891* (2013.01); *G06F 21/6209* (2013.01); *H04L 9/0822* (2013.01);
(Continued)

(58) Field of Classification Search
CPC ... H04L 9/0891; H04L 9/0897; H04L 9/0822; H04L 9/14; G06F 21/6209
See application file for complete search history.

(56) References Cited

U.S. PATENT DOCUMENTS 9,722,974 B1 * 8/2017 Fuller ................... H04L 63/061
10,516,530 B2 12/2019 Dewitt et al.
(Continued)

OTHER PUBLICATIONS

"Vault", A HashiCorp Project, Published on various days in Apr., May & Sep. 2015, https://web.archive.org/web/20150503005402/http://vaultproject.io/—Sections "Intro" and "Docs". (Year: 2015).*

*Primary Examiner* — Robert B Leung
(74) *Attorney, Agent, or Firm* — Kunzler Bean & Adamson

(57) ABSTRACT

Apparatuses, methods, systems, and program products are disclosed for secure data handling and storage. An apparatus includes a lock module that receives a request to decrypt encrypted data that is stored in a data repository, the encrypted data encrypted using a first encryption key, and unlocks an encryption engine in response to the request. An encryption engine may be unlocked using a master key that is generated based on combination of a plurality of keys held by a plurality of key holders. An apparatus includes a decryption module that decrypts encrypted data using an encryption engine. Encrypted data may be decrypted using a first encryption key. An apparatus includes an encryption module that re-encrypts decrypted data using an encryption engine. Decrypted data may be re-encrypted with a second encryption key that is different than a first encryption key and stored in a data repository.

20 Claims, 8 Drawing Sheets

Related U.S. Application Data

(60) Provisional application No. 62/289,043, filed on Jan. 29, 2016.

(52) U.S. Cl.
CPC .......... *H04L 9/0861* (2013.01); *H04L 9/0897* (2013.01); *H04L 9/14* (2013.01)

(56) References Cited

U.S. PATENT DOCUMENTS

| | | | |
|---|---|---|---|
| 2003/0159071 A1* | 8/2003 | Martinez | G06F 21/31 726/8 |
| 2004/0143733 A1* | 7/2004 | Ophir | H04L 63/0471 713/153 |
| 2005/0154733 A1* | 7/2005 | Meltzer | H04L 63/1416 |
| 2007/0079119 A1* | 4/2007 | Mattsson | G06F 21/6227 713/164 |
| 2008/0031447 A1* | 2/2008 | Geshwind | H04L 9/3226 380/46 |
| 2008/0046349 A1* | 2/2008 | Elberg | G06Q 40/00 705/35 |
| 2014/0236792 A1* | 8/2014 | Pant | G06Q 40/02 705/35 |
| 2015/0012443 A1* | 1/2015 | Bhat | G06Q 20/108 705/50 |
| 2015/0052358 A1* | 2/2015 | Udupi | H04L 63/062 713/171 |
| 2016/0191499 A1* | 6/2016 | Momchilov | G06F 21/41 713/171 |
| 2016/0212109 A1* | 7/2016 | Hird | H04L 63/062 |
| 2017/0222804 A1* | 8/2017 | Dewitt | G06F 21/6209 |
| 2018/0007048 A1* | 1/2018 | Weaver | H04L 63/10 |

* cited by examiner

SECURE DATA HANDLING AND STORAGE

CROSS REFERENCES TO OTHER APPLICATIONS

This application is a continuation of and claims priority to U.S. patent application Ser. No. 15/420,026 entitled "SECURE DATA HANDLING AND STORAGE" and filed on Jan. 30, 2017, for Brandon Dewitt, which claims the benefit of U.S. Provisional Patent Application No. 62/289,043 entitled "SECURE DATA HANDLING AND STORAGE" and filed on Jan. 29, 2016, for Brandon Dewitt, et al., each of which is incorporated herein by reference in their entirety for all purposes.

FIELD

This invention relates to encryption and more particularly relates to the secure handling and storage of credentials and/or other user information.

BACKGROUND

Users' sensitive data is constantly under attack by hackers attempting to misappropriate the users' data. Therefore, it is important to secure data at all points within a system where the data may be misappropriated, e.g., while the data is at rest, while the data is being transmitted, or the like. Similarly, it is important to secure keys that are used to encrypt data so that the keys are also not misappropriated to decrypt the data.

BRIEF SUMMARY

An apparatus, in one embodiment, includes a lock module that receives a request to decrypt encrypted data that is stored in a data repository, the encrypted data encrypted using a first encryption key, and unlocks an encryption engine in response to the request. An encryption engine may be unlocked using a master key that is generated based on combination of a plurality of keys held by a plurality of key holders. An apparatus, in a further embodiment, includes a decryption module that decrypts encrypted data using an encryption engine. Encrypted data may be decrypted using a first encryption key. An apparatus, in certain embodiments, includes an encryption module that re-encrypts decrypted data using an encryption engine. Decrypted data may be re-encrypted with a second encryption key that is different than a first encryption key and stored in a data repository.

A system, in one embodiment, includes a data repository that stores encrypted data, an encryption engine, and an apparatus. An apparatus, in one embodiment, includes a lock module that receives a request to decrypt encrypted data that is stored in a data repository, the encrypted data encrypted using a first encryption key, and unlocks an encryption engine in response to the request. An encryption engine may be unlocked using a master key that is generated based on combination of a plurality of keys held by a plurality of key holders. An apparatus, in a further embodiment, includes a decryption module that decrypts encrypted data using an encryption engine. Encrypted data may be decrypted using a first encryption key. An apparatus, in certain embodiments, includes an encryption module that re-encrypts decrypted data using an encryption engine. Decrypted data may be re-encrypted with a second encryption key that is different than a first encryption key and stored in a data repository.

An apparatus, in one embodiment, includes means for receiving a request to decrypt encrypted data that is stored in a data repository, the encrypted data encrypted using a first encryption key, and means for unlocking an encryption engine in response to the request. An encryption engine may be unlocked using a master key that is generated based on combination of a plurality of keys held by a plurality of key holders. An apparatus, in a further embodiment, includes means for decrypting encrypted data using an encryption engine. Encrypted data may be decrypted using a first encryption key. An apparatus, in certain embodiments, includes means for re-encrypting decrypted data using an encryption engine. Decrypted data may be re-encrypted with a second encryption key that is different than a first encryption key and stored in a data repository.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
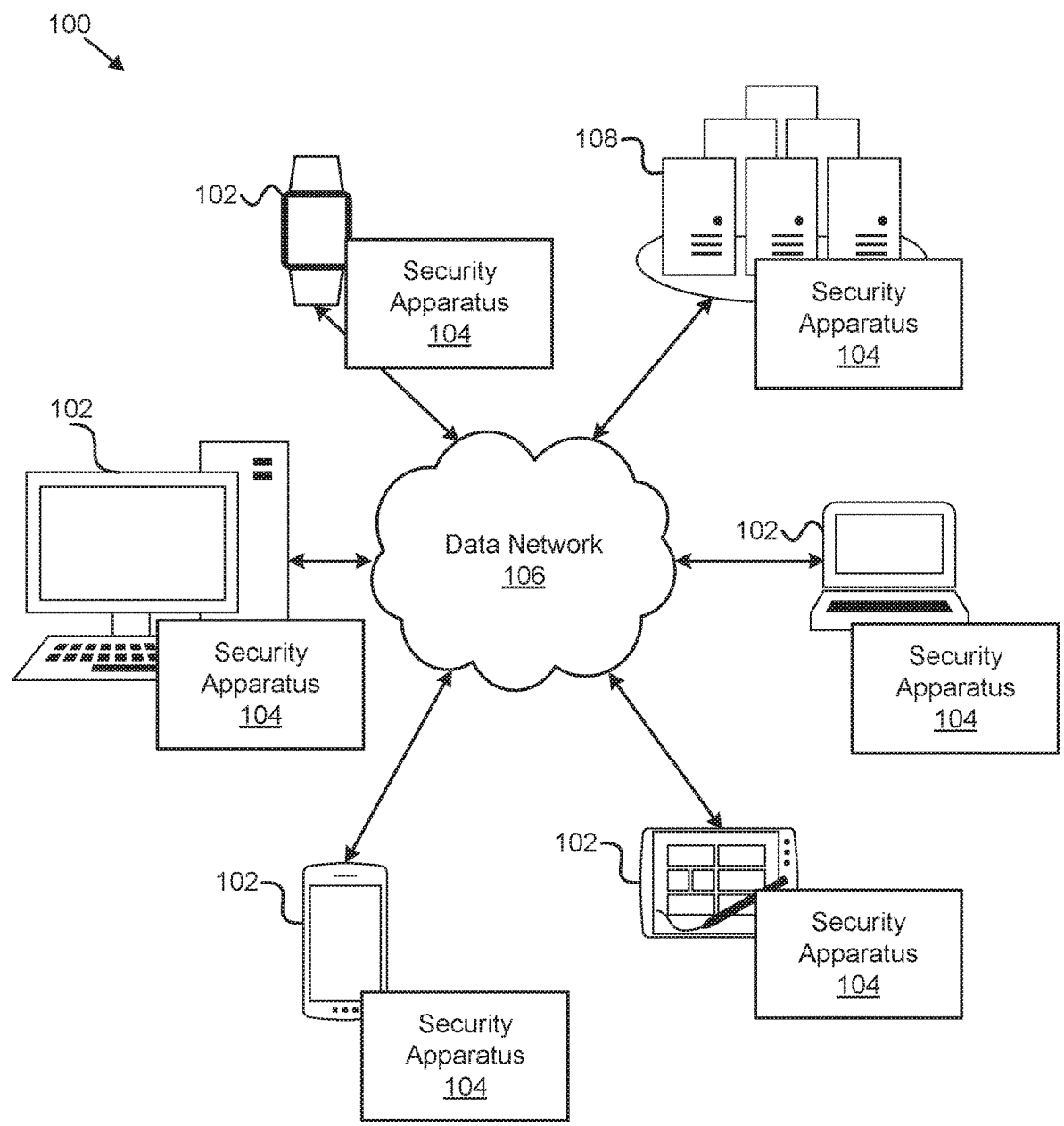
FIG. 1 depicts a schematic block diagram of one embodiment of a system for secure data handling and storage.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules (or engines), in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for secure data handling and storage. In one embodiment, the system 100 includes one or more information handling devices 102, one or more security apparatuses 104, one or more data networks 106, and one or more servers 108. In certain embodiments, even though a specific number of information handling devices 102, security apparatuses 104, data networks 106, and servers 108 are depicted in FIG. 1, one of skill in the art will recognize, in light of this disclosure, that any number of information handling devices 102, security apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may include instructions for encrypting data, decrypting data, generating encryption keys, sending data, receiving data, and/or the like.

In one embodiment, the security apparatus 104 is configured to unlock an encryption engine for encrypting and decrypting data using a combination of a plurality of provided keys received from a plurality of key holders. With the encryption engine unlocked, the security apparatus 104 may continuously, or at some other frequency, receive data that is encrypted with a first encryption key. The security apparatus 104 may decrypt the data and then re-encrypt the data using a second encryption key.

In this manner, the security apparatus 104 continuously re-encrypts data, such as a data-at-rest stored in a database, using different keys to increase the security and integrity of the data by making it more difficult for the data to be decrypted with misappropriated keys, for example. The security apparatus 104, including its various sub-modules, may be located on one or more information handling devices 102 in the system 100, one or more servers 108, one or more network devices, one or more security systems, and/or the like. The security apparatus 104 is described in more detail below with reference to FIGS. 2 and 3.

In various embodiments, the security apparatus 104 may be embodied as a hardware appliance that can be installed or deployed on an information handling device 102, on a server 108, or elsewhere on the data network 106. In certain embodiments, the security apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the security apparatus 104 may include a power interface, a wired and/or wireless network interface, a graphical interface that attaches to a display, and/or a semiconductor integrated circuit device as described below, configured to perform the functions described herein with regard to the security apparatus 104.

The security apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like.

In one embodiment, the security apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the security apparatus 104.

The semiconductor integrated circuit device or other hardware appliance of the security apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the security apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like. The system 100 may include a plurality of data networks 106.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers 108 may be communicatively coupled (e.g., networked) over a data network 106 to one or more information handling devices 102. The one or more servers 108 may store data associated with an information handling device 102, with a user, and/or the like. A server 108 may store sensitive data, such as login credentials, financial information, and/or other personal identifying information. The sensitive data may be stored in one or more databases.

Figure 2:
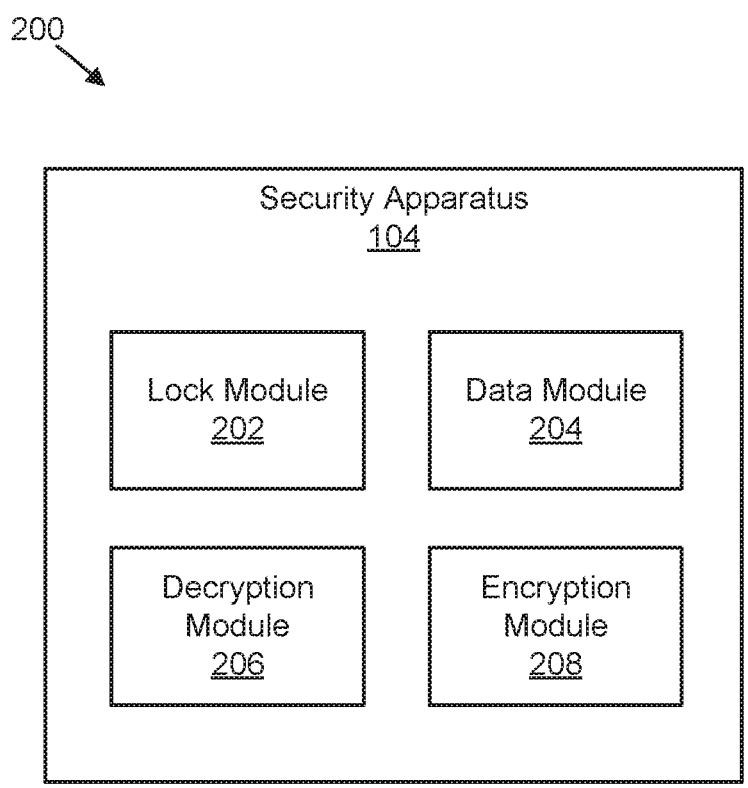
FIG. 2 depicts a schematic block diagram of one embodiment of an apparatus for secure data handling and storage.

FIG. 2 depicts one embodiment of an apparatus 200 for secure data handling and storage. In one embodiment, the apparatus 200 includes an embodiment of a security apparatus 104. The security apparatus 104, in certain embodiments, includes one or more of a lock module 202, a data module 204, a decryption module 206, and an encryption module 208, which are described in more detail below.

The lock module 202, in one embodiment, is configured to receive a plurality of keys for unlocking an encryption engine. As used herein, an encryption engine is an apparatus, module, engine, object, library, and/or the like that is embodied as software, hardware, and/or a combination of software and hardware and is configured to provide encryption and decryption capabilities, including encryption key generation, rotation, storage, and management. An example of an encryption engine may be Vault® by HashiCorp of San Francisco, Calif. As described herein, the encryption engine may be used when it is unlocked and may not be used, e.g., may not be available for use for encrypting or decrypting data, when it is locked. In this manner, encryption keys, which may be stored at the encryption engine, may be protected from unauthorized access when it is locked.

In one embodiment, each of the keys that the lock module 202 receives for unlocking the encryption engine are associated with a key holder. A key holder, as used herein, may be an authorized user, program, service, and/or the like. For example, an IT administrator, a CIO, a supervisor, or the like may be authorized key holders. The lock module 202, in some embodiments, may request the keys from the key holders using an electronic request such as a text message, a push notification, an email, a chat message, and/or the like. In various embodiments, the key holders may store their keys in a secure location that is accessible to the lock module 202, such as a secure server, secure database, or the like.

The lock module 202, in one embodiment, is configured to combine at least a subset of the plurality of keys to generate a master key for unlocking the encryption engine. For instance, each of ten key holders may have a different private asymmetric encryption key. In order to unlock the encryption engine, the lock module 202 may request and/or receive at least a subset of the private encryption keys of the key holders, such as five of the keys. The lock module 202 may then combine the five keys to generate a master key for unlocking the encryption engine. The number of keys that are required to generate the master key may be configurable by a user such as an IT administrator, a CIO, and/or the like.

In some embodiment, the lock module 202 may perform various cryptographic processes, logical operations, or the like on the received keys to generate the master key. In certain embodiments, the lock module 202 uses the master key to unlock or decrypt a private key that is stored at, or otherwise associated with, the encryption engine. When the private key is unlocked with the master key, the encryption engine may be unlocked.

In various embodiments, the lock module 202 locks the encryption engine in response to detecting changes in a configuration of the encryption engine. For instance, the lock module 202 may detect network configuration changes, such as changes in network ports that the encryption engine is listening on, changes in plugins (e.g., plugins that may be associated with key generation, encryption algorithms, or the like), and/or the like. The lock module 202 may also lock the encryption engine in response to receiving a manual request to lock the encryption engine, e.g., from an authorized user such as an IT administrator, a supervisor, or the like. The lock module 202 may also lock the encryption engine in response to detecting a data leakage from the encryption engine. The lock module 202, in certain embodiments, locks the encryption engine in response to detecting an unauthorized attempt to access the encryption engine. In this manner, the lock module 202 can lock the encryption engine to protect sensitive data from being misappropriated.

In one embodiment, the lock module 202 unlocks the encryption engine when the encryption engine is first initialized or setup. For instance, the lock module 202 may unlock the encryption engine when a session begins for encrypting and decrypting data, and the lock module 202 may maintain the unlocked status of the encryption engine until the encryption engine or session is shut down, reset, or reinitialized.

In a further embodiment, the lock module 202 unlocks the encryption engine in response to receiving a request to encrypt or decrypt data. In such an embodiment, the lock module 202 may unlock the encryption engine only while the encryption engine is actively encrypting and/or decrypting data, and then lock the encryption engine until the lock module 202 receives another request to encrypt or decrypt data.

The data module 204, in one embodiment, is configured to receive, at the encryption engine, data that has been encrypted with a first encryption key. The encrypted data may comprise data-at-rest, e.g., data stored in a database, on a server, and/or the like, and not necessarily data that is being transmitted between two or more devices. In some embodiments, the data module 204 receives the encrypted data at regular or continuous intervals.

For example, the data module 204 may receive the encrypted data on a continuous basis, e.g., without a delay between sets of data. In such an embodiment, the data module 204 may continuously receive a stream or flow of encrypted data from a database or server 108. In certain embodiments, the data module 204 receives data at predetermined time intervals, such as every second, minute, hour, day, and/or the like. The first encryption key may comprise an encryption key generated at the encryption engine and used to encrypt the data prior to the data being stored at a server 108, database, or the like.

As described above, the encrypted data may include sensitive data or information for a user, member, or the like. The sensitive information may include login credentials, passwords, shared secrets, financial information, and/or other personal identifying information. For example, the sensitive information may include credentials for logging into a bank account or aggregation server associated with the user. The encrypted data may include records of a database that stores information associated with one or more users.

In certain embodiments, the encrypted data is stored at a location that is separate from the encryption engine, e.g., the encrypted data may be stored on a server 108 that is separate from a device where the encryption engine is executing. In such an embodiment, the encrypted data may be sent to the encryption engine via the data module 204 over a data network 106. The encrypted data, prior to being sent over the data network 106, may be further encrypted using transport layer security (TLS), secure sockets layer (SSL), and/or the like cryptographic protocol.

In one embodiment, the data module 204 can receive data at the encryption engine in response to the encryption engine being unlocked. In certain embodiments, however, the data module 204 rejects, ignores, disregards, or the like data at the encryption engine in response to the encryption engine not being unlocked.

In one embodiment, the decryption module 206 is configured to decrypt the encrypted data that the data module 204 receives using the first encryption key. In one embodiment, the decryption module 206 checks a key version identifier, e.g., a key version number that is stored with the encrypted data (e.g., as metadata with the encrypted data) to determine which encryption key was used to encrypt the data. The decryption module 206, based on the key version identifier, may check a list of previously used encryption keys to find the encryption key that matches the key version identifier, which it uses to decrypt the encrypted data.

The encryption module 208, in one embodiment, is configured to re-encrypt the decrypted data using a second encryption key. The second encryption key may be a newer encryption key, or an encryption key that has never been used to encrypt this particular data. The encryption module 208 may encrypt the data with the new encryption key and then send the data back to the location where the data is stored, e.g., a server 108 and/or database. Prior to sending the data, the encryption module 208 may further encrypt the encrypted data to protect it while it is in transit using TLS, SSL, and/or the like. The encryption of the data in transit may be based on various encryption protocols such as advanced encryption standard (AES), ZeroMQ, and/or the like.

Figure 3:
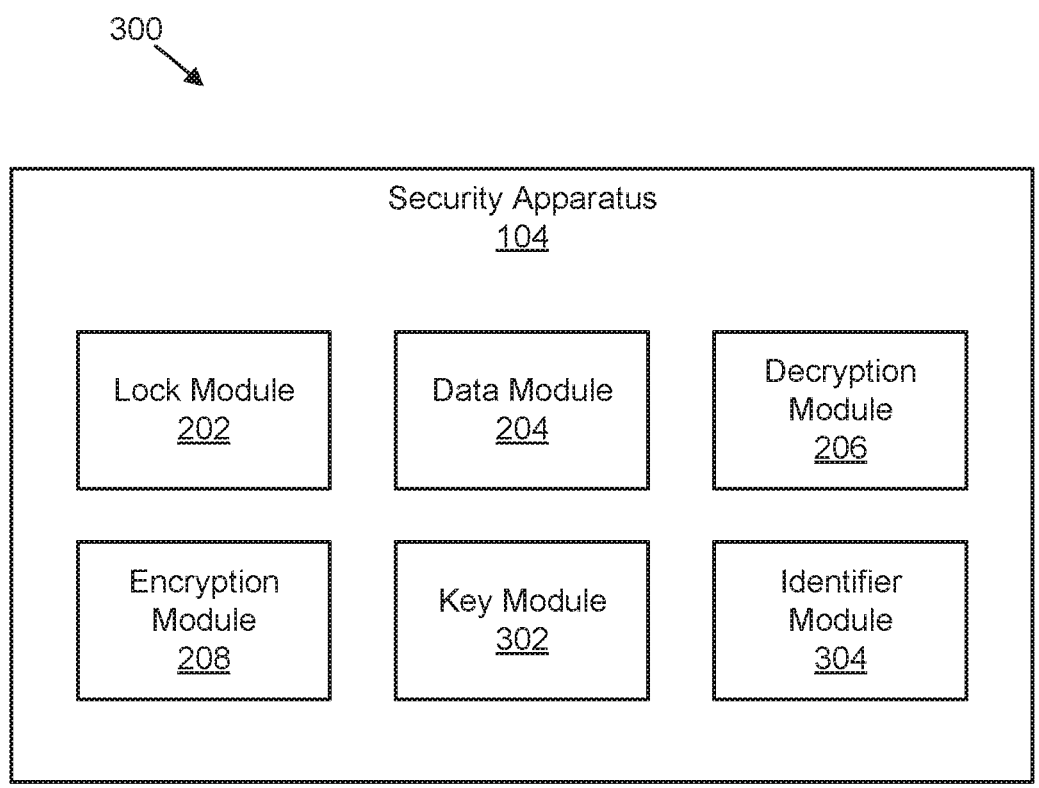
FIG. 3 depicts a schematic block diagram of one embodiment of another apparatus for secure data handling and storage.

FIG. 3 depicts one embodiment of an apparatus 300 for secure data handling and storage. In one embodiment, the apparatus 300 includes an embodiment of a security apparatus 104. The security apparatus 104, in certain embodiments, includes one or more of a lock module 202, a data module 204, a decryption module 206, and an encryption module 208, which may be substantially similar to the lock module 202, the data module 204, the decryption module 206, and the encryption module 208 described above with reference to FIG. 2. Furthermore, the security apparatus may include one or more of a key module 302 and an identifier module 304, which are described in more detail below.

The key module 302, in one embodiment, is configured to generate, on a consistent frequency, new encryption keys for re-encrypting the user's sensitive information. For instance, the key module 302 may be located on or otherwise a part of the encryption engine, and may generate new encryption keys on a regular basis. The frequency with which the key module 302 generates new keys may be determined as a function of how often the sensitive information is re-encrypted, how much sensitive information is being re-encrypted, and/or the like.

For example, if the sensitive information is continuously being re-encrypted, and it takes about one minute to go through the entire data set that is being re-encrypted (which may be calculated based on the processing speed of the encryption engine, the size of each record, the bandwidth of the network 106 that the data is sent on, or the like), then the key module 302 may generate new encryption keys every minute.

In such an embodiment, the key module 302 may maintain a list of keys that have been generated, keys that have been used, and/or keys that are no longer in use. The key module 302, in certain embodiments, may determine which keys are no longer in use and expire the keys so that the keys are not used again. In such an embodiment, the key module 302 may mark a key as expired, may remove the key from a list of available keys, may add the key to a black list of keys, and/or the like. In this manner, the key module 302 ensures that previously used keys, which may have been misappropriated, are not reused. In certain embodiments, the key module 302 audits, tracks, or otherwise collects information related to the use of keys. Such information may include the data, time, user, request, response, node, and result associated with each key that is accessed.

The identifier module 304, in one embodiment, is configured to assign a unique identifier, version number, and/or the like to the keys that the key module 304 generates. The identifier may comprise a number, string, and/or the like. The identifier module 304 may store the identifier for a key that is used to encrypt data as metadata associated with the encrypted data. In this manner, when the data is sent to the encryption engine for re-encryption, the key module 302 can determine which key version was used to encrypt the data so that the decryption module 206 can decrypt the data using the key identified by the version number.

For example, the key module 302 may maintain a list of various keys that have been used to encrypt various records, data sets, or the like. In order to determine which key was used to encrypt data, the identifier module 304 may generate an identifier for a particular key and store the identifier with the key list and also with the data that was encrypted with the key, e.g., as metadata.

When the data module 204 receives data to be encrypted, decrypted, or re-encrypted, the key module 302 may check the identifier of the key used to encrypt the data to determine which key to use to decrypt the data. The key module 302 may also track the data that is received, and the keys that have been used to encrypt the data to determine whether there are keys that are included on the key list, but are no longer in use. If so, the key module 302 may expire the unused keys from the key list, as described above, so that the keys are not used again.

Figure 4A:
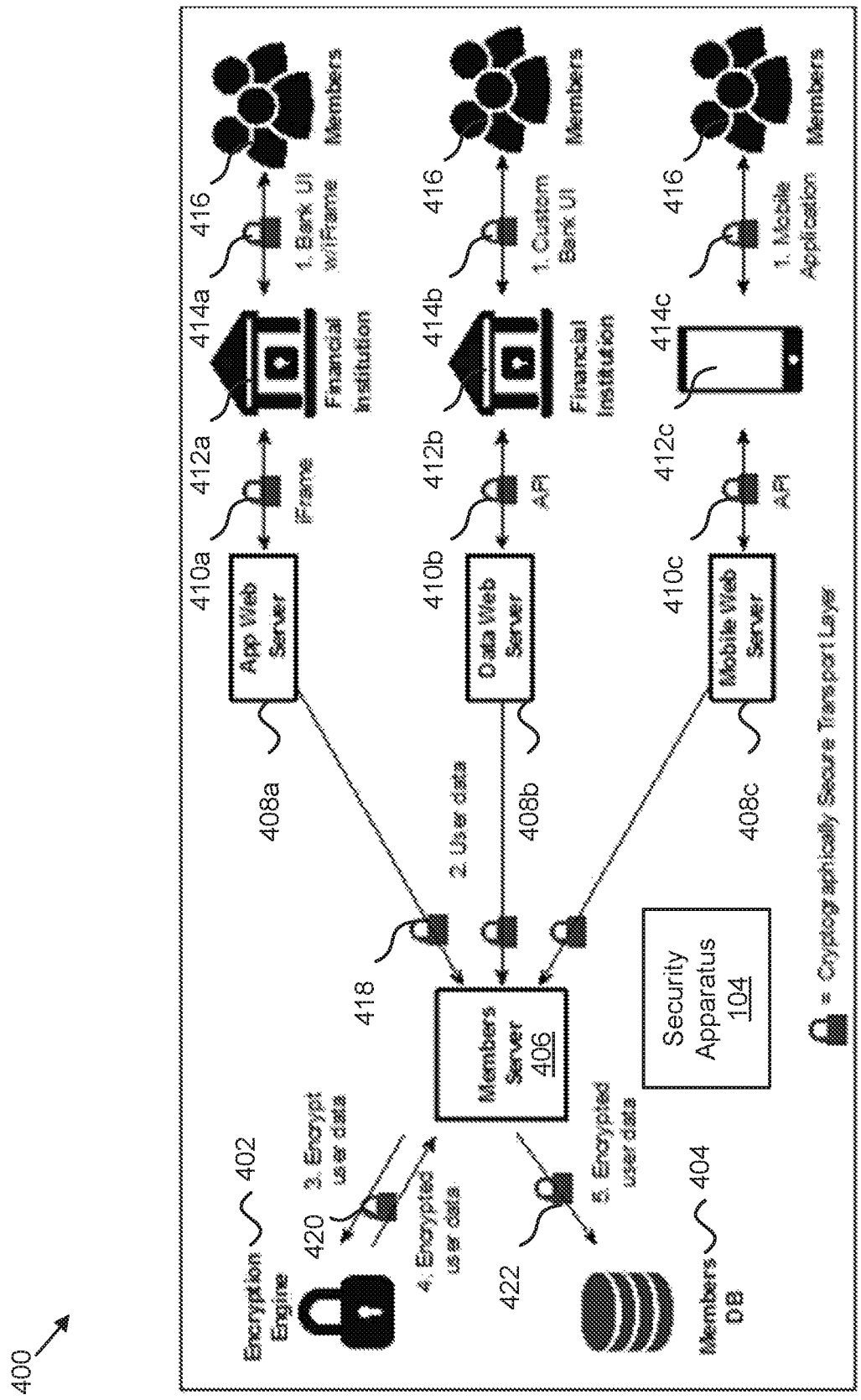
FIGS. 4A-4D depict schematic block diagrams of various portions of a system for secure data handling and storage.

FIG. 4A depicts one embodiment of a system 400 that includes a security apparatus 104 as described above. The system 400, in one embodiment, may be a financial information system, a healthcare information system, or the like. For convenience, the system 400 will be described with reference to a financial information system. In one embodiment, one or more members 416 or users access their financial information using various connection methods. For instance, the members 416 may access their financial information through a financial institution's 412a-b interface, such as a web application of a financial institution 412a-c that includes an iFrame, or other web portal 414a, a custom financial institution 412a-c interface 414b, or a mobile application 414c for a financial institution 412a-c.

In certain embodiments, the members' 416 connections 414a-c to the financial institution 412a-c may be secured using application-level web calls using HTTPS, or another secure transmission protocol that implements TLS (TLS 1.2), SSL, or the like. In certain embodiments, the interfaces 414a-c may be interfaces to aggregated financial data associated with a member 416. As used herein, aggregated financial data may comprise information from various accounts held by a member 416 at different financial institutions. The member 416 may provide credentials and/or other sensitive identifying information, via the interface 414a-c, to access their aggregated financial data.

The information provided by a member 416 may be sent from the interfaces 414a-c to a front-end server 408a-c such as an app web server 408a, a data web server 408b, and a mobile web server 408c over a secure network connection 410a-c. The front-end servers may communicate with back-end servers 406 via application programming interface (API) calls, remote procedure calls (RPCs), and/or the like that are secured using TLS, SSL, and/or the like.

The back-end servers may include a member server 406. The member server 406 may be configured to store, retrieve, access, and/or the like sensitive information associated with a member. The sensitive information may include login credentials, passwords, financial information, and/or other personal identifying information based on the type of information system being implemented. In certain embodiments, the member server 406 is in communication with an encryption engine 402 and a member database 404, which is used to store the members' sensitive information.

In various embodiments, prior to storing sensitive information provided by a member 416 in the member database 404, the member server 406 may request that the sensitive information be encrypted. The member server 406 may send a request to the encryption engine 402, over a secure data connection 420 to encrypt the data prior to the data being stored in the member database 404. In response to the request received at the encryption engine, the lock module 202 may unlock the encryption engine, the data module 204 may receive the data, and the encryption module 208 may encrypt the data using a recently generated encryption key. The encrypted data may be sent back to the member server 406, which may then send the data to the member database 404 for storage over a secure data connection 422. In certain embodiments, the transmission of data through the system 400 is session based such that a session tracks the data and the connections between the various node within the system 400.

Figure 4B:
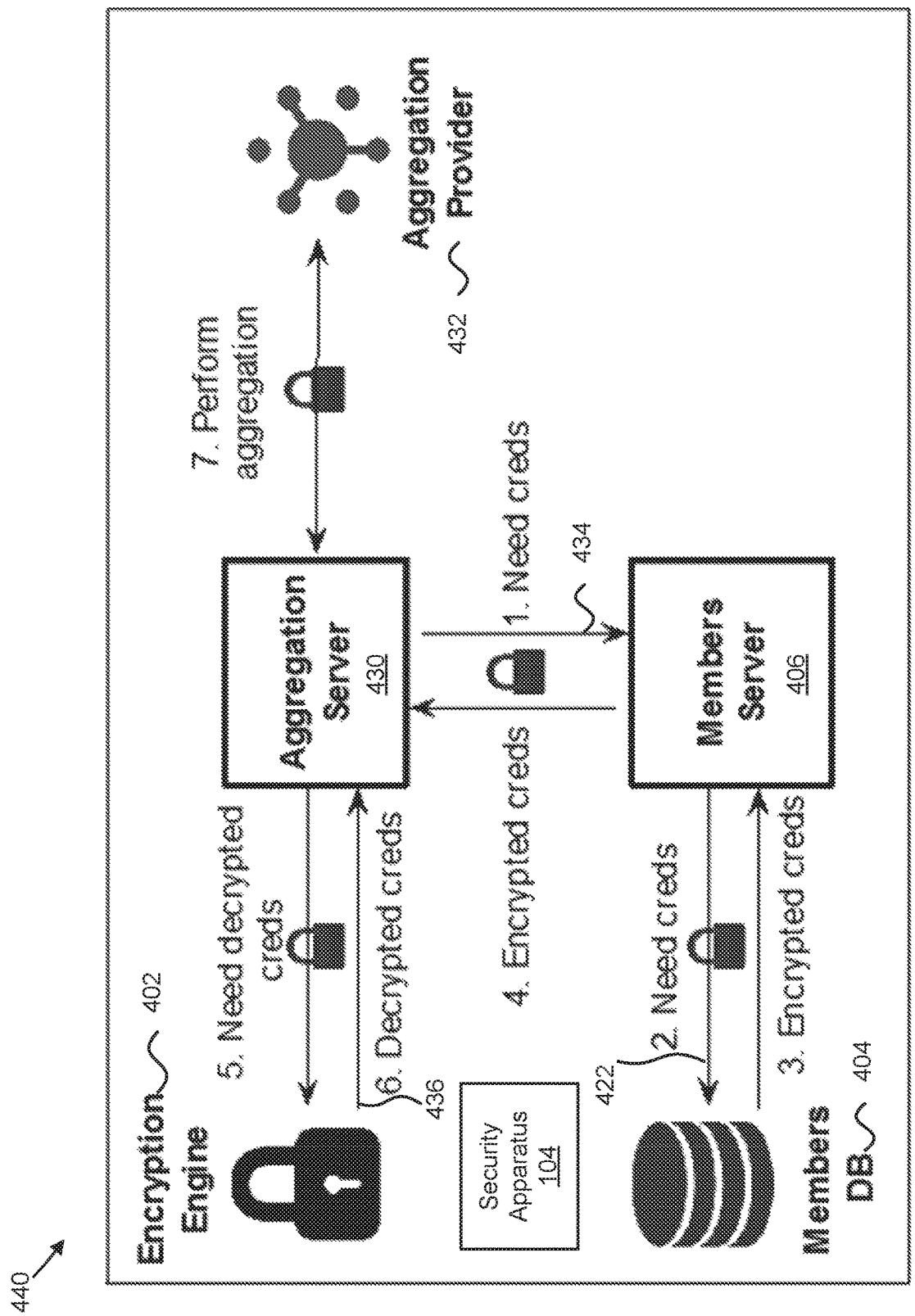

FIG. 4B depicts one embodiment of a portion 440 of a system 400 described above with reference to FIG. 4A. In certain embodiments, in order to aggregate user or member 426 information from a plurality of different financial institutions 412a-c, the system 400 may include an aggregation server 430. The aggregation server 430 may be configured to request financial data form the various financial institutions associated with a member 426. To do this, the aggregation server 430 may need to use the member's 426 login credentials that are stored in the member database 404 to access the member's 426 financial information at a financial institution 412a-c.

The aggregation server 430 may request the member's 426 credentials from the member server 426 over a secure connection 434. The member server 406 may access the member's 426 encrypted credentials from the member database 404, over a secure connection 422. The member server 406 may receive the encrypted credentials, and may forward the encrypted credentials to the aggregation server 430. The aggregation server 430 may then request that the encryption engine decrypt the credentials over a secure data connection 436.

In certain embodiments, the encryption engine 402 first determines whether the aggregation server 430 is authorized to communicate with or access the encryption engine 402. In such an embodiment, the encryption engine 402 checks the aggregation server's credentials, which may be a one or more tokens that are issued prior to the aggregation server 430 being installed in the system 400. The tokens may be based on an application executing on the aggregation server 430, unique identifying information for the aggregation server (e.g., based on hardware, a MAC address, or the like), and/or the like. The encryption engine 402 may receive the token(s) and check them against a list of allowed tokens to determine whether the aggregation server 430 is authorized to use the encryption engine 430, which adds an additional level of security to the system 400.

The lock module 202, in response to receiving the decryption request, may unlock the encryption engine 402. The data module 204 may receive the encrypted data, e.g., the encrypted login credentials, and the decryption module 206 may determine which encryption key was used to encrypt the data (based on the key version identifier, for example) and may decrypt the credentials. The credentials may then be sent to the aggregation server 430, which may use the credentials to access the member's account information from the aggregation provider 432, e.g., a financial institution 412a-c.

Figure 4C:
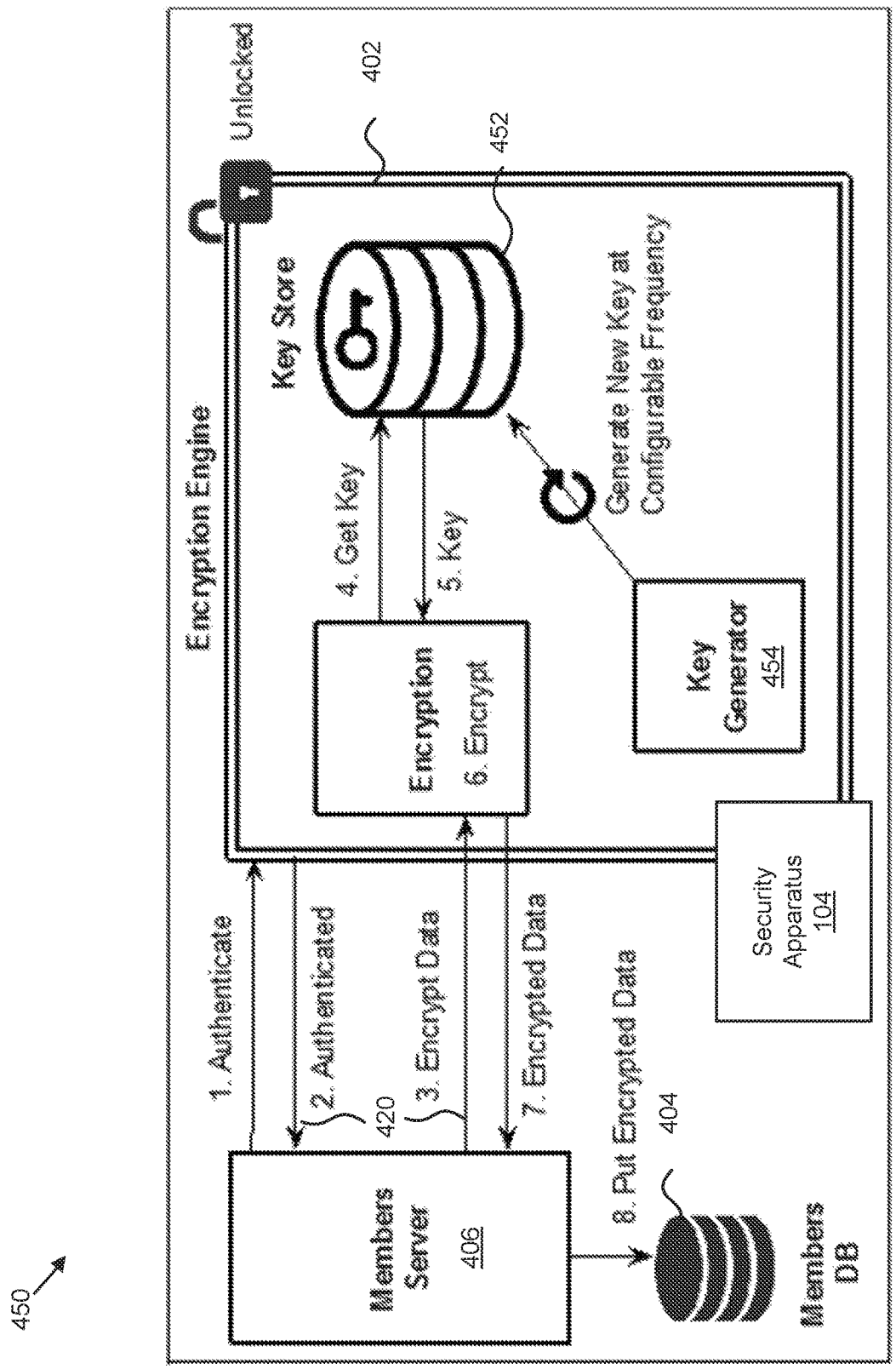

FIG. 4C depicts one embodiment of a portion 450 of the system 400 described above with reference to FIG. 4A depicting the interaction between a member server 406 and the encryption engine 402 for encrypting member data to be stored in the member database 404. In one embodiment, the member server 406 authenticates itself to the encryption engine 402 using one or more tokens, as described above with reference to the aggregation server in FIG. 4B. If the encryption engine 402 determines that the member server 406 is an authorized node, the lock module 202 unlocks the encryption engine 402 in response to a request to encrypt the member's 426 data, if the encryption engine 402 is not already unlocked. The data module 2404 may receive data to be encrypted from the member server 406 over a secure connection 420, such as the user's credentials for one or more financial institutions where the user has an account.

The encryption module 208 and/or the key module 302 may determine which encryption key generated by the key generator 454, e.g., the key module 302, is the most recent or next available key. As described above the key module 302 may generate new keys on a regular basis, which may be stored in a key store 452, so that new encryption keys are used to encrypt data instead of re-using the same encryption keys, which increases the security of the encrypted data. The identifier module 304 may also include a key identifier, such as a key version number, with each encryption key that is generated. The data module 204 may send the encrypted data back to the member server 406, over a secure communication connection 420, which may store the encrypted data in the member database 404.

Figure 4D:
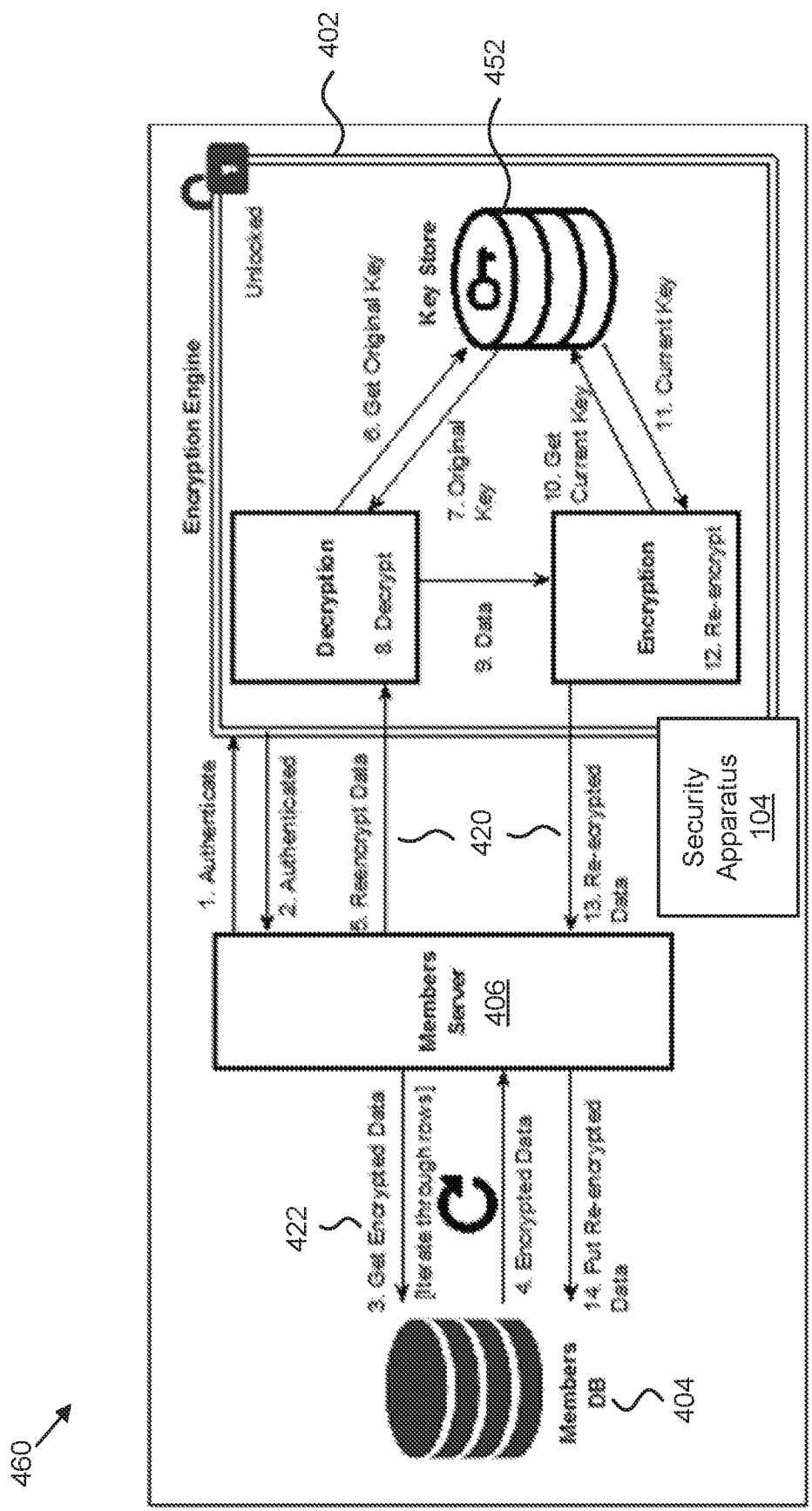

FIG. 4D depicts one embodiment of portion 460 of the system 400 described above with reference to FIG. 4A depicting the re-encryption of data-at-rest. In one embodiment, data-at-rest includes data that is stored in the member database 404 and consists of the members' sensitive information. The member data may be encrypted and re-encrypted on a continuous or ongoing basis to maintain the integrity and security of the data. In one embodiment, the lock module 202 ensures that the encryption engine 402 is unlocked prior to processing any data from the member database 404.

In some embodiments, the member server 406 iterates over each row of the member database, and sends each row over a secure connection 420, on a continuous basis, to the encryption engine 402 to be re-encrypted. In such an embodiment, the data module 204 receives the encrypted rows. The decryption module 206, in a further embodiment, determines the encryption key that was used to encrypt the row data, based on the key identifier stored with the row data, and decrypts the encrypted data.

The encryption module, in one embodiment, 208 re-encrypts the row data with a new or more recent encryption key that the key module 302 generates. The identifier module 304 stores the key identifier for the new key with the re-encrypted row, and the encryption module 208 and/or the data module 204 sends the encrypted row data to the member server 406, over the secure connection 420, to be stored in the member database 404. In this manner, the data in the member database 404 is continuously re-encrypted to reduce the chances that the data can be decrypted and misappropriated.

Figure 5:
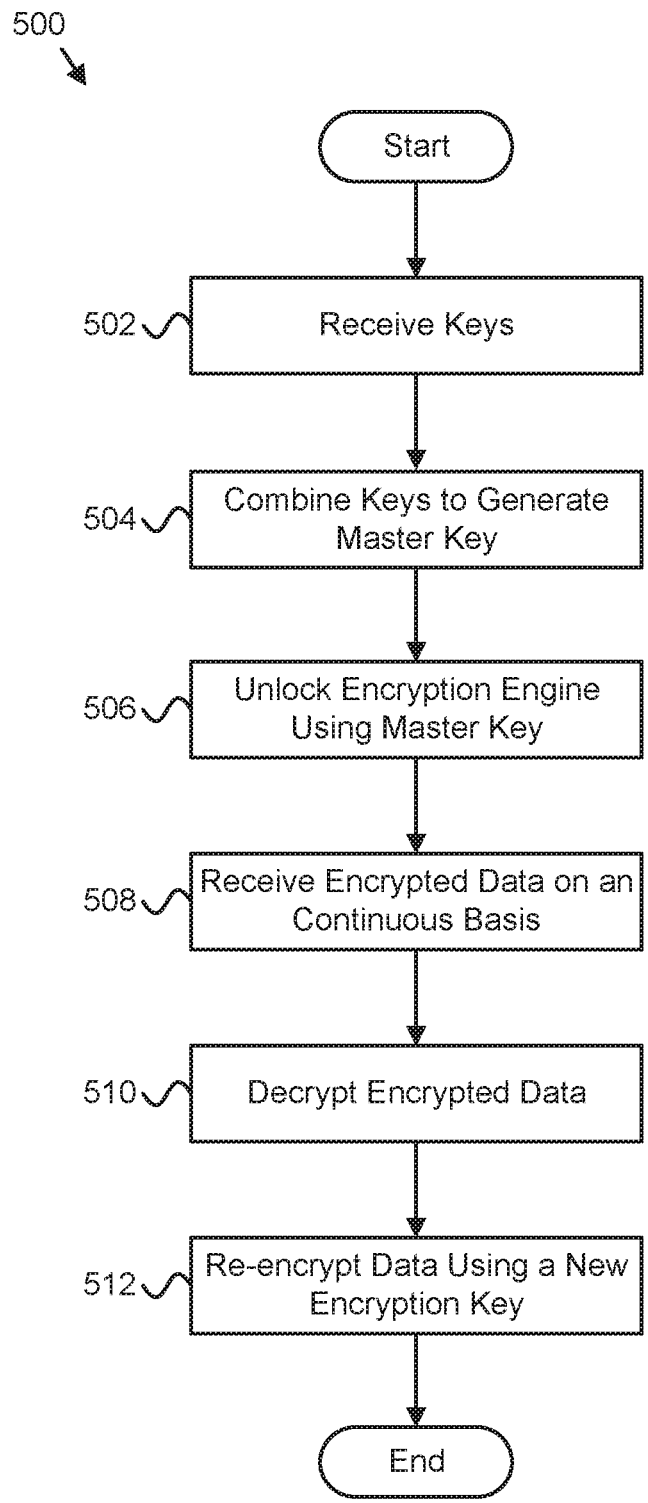
FIG. 5 depicts a schematic flow-chart diagram of one embodiment of a method for secure data handling and storage.

FIG. 5 is a schematic flow-chart diagram illustrating one embodiment of a method 500 for secure data handling and storage. In one embodiment, the method 500 begins and the lock module 202 receives 502 a plurality of keys for unlocking an encryption engine. In certain embodiments, each key is associated with an authorized key holder. In some embodiments, the lock module 202 combines 504 at least a subset of the plurality of keys to generate a master key. The lock module 202, in a further embodiment, unlocks 506 the encryption engine using the master key.

In some embodiments, the data module 204 receives 508, at the encryption engine on an ongoing basis, encrypted data. The encrypted data may be encrypted using a first encryption key. The data may include sensitive information for one or more users, such as credentials, financial data, and/or the like.

In a further embodiment, the decryption module 206 decrypts 510 the encrypted data using the first encryption key. The encryption module 208, in various embodiments, re-encrypts 512 the decrypted data using a second encryption key. The second encryption key may be a newer or more recent encryption key than the first encryption key, and the method 500 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a lock module that:
      receives a request to decrypt encrypted data that is stored in a data repository, the encrypted data encrypted using a first encryption key; and
      unlocks an encryption engine in response to the request, the encryption engine unlocked using a master key that is generated based on combination of a plurality of keys held by a plurality of key holders;
   a decryption module that decrypts the encrypted data using the encryption engine, the encrypted data decrypted using the first encryption key; and
   an encryption module that re-encrypts the decrypted data using the encryption engine, the decrypted data re-encrypted with a second encryption key that is different than the first encryption key, the re-encrypted data stored in the data repository,
   wherein the lock module:
      detects a change in a configuration of the encryption engine; and
      locks the encryption engine in response to the detected configuration change.

2. The apparatus of claim 1, further comprising a data module that receives the encrypted data from the data repository on a continuous basis, in response to the encryption engine being unlocked, without a delay between different sets of encrypted data.

3. The apparatus of claim 2, wherein the data module receives the encrypted data as a continuous stream of data transmitted from the data repository.

4. The apparatus of claim 3, wherein the data module further encrypts the encrypted data using a cryptographic protocol while the encrypted data is in transit to the encryption engine.

5. The apparatus of claim 1, wherein the encrypted data that is stored in the data repository comprises a plurality of records, each record storing information associated with one or more users.

6. The apparatus of claim 5, wherein the encrypted data comprises sensitive data for each of the one or more users, the sensitive data comprising electronic user credentials for logging the one or more users into one or more user accounts at a financial institution.

7. The apparatus of claim 1, wherein the decryption module checks a key version identifier that is stored as metadata with the encrypted data to determine the first encryption key that was used to encrypt the encrypted data.

8. The apparatus of claim 7, wherein the decryption module cross references the key version identifier with a list of previously used encryption keys to locate the encryption key that matches the key version identifier.

9. The apparatus of claim 1, wherein the second encryption key that is used to re-encrypt the decrypted data comprises a newly generated encryption key that has never been used.

10. The apparatus of claim 1, further comprising a key module that generates, on a consistent frequency, new encryption keys for re-encrypting the encrypted data in the data repository, wherein the key module expires encryption keys that are no longer in use such that the expired encryption keys cannot be used again.

11. The apparatus of claim 1, wherein the lock module requests the keys from the plurality of key holders for generating the master key using an electronic request, the electronic request selected from group consisting of a text message, a push notification, an email, and a chat message.

12. The apparatus of claim 11, wherein the detected configuration changes comprise one or more of a change in network ports and a change in available backends used by the encryption engine.

13. A system comprising:
   a data repository storing encrypted data;
   an encryption engine; and
   an apparatus comprising:
      a lock module that:
         receives a request to decrypt encrypted data that is stored in the data repository, the encrypted data encrypted using a first encryption key; and
         unlocks the encryption engine in response to the request, the encryption engine unlocked using a master key that is generated based on combination of a plurality of keys held by a plurality of key holders;
      a decryption module that decrypts the encrypted data using the encryption engine, the encrypted data decrypted using the first encryption key; and
      an encryption module that re-encrypts the decrypted data using the encryption engine, the decrypted data re-encrypted with a second encryption key that is different than the first encryption key, the re-encrypted data stored in the data repository,
      wherein the lock module:
         detects a change in a configuration of the encryption engine; and
         locks the encryption engine in response to the detected configuration change.

14. The system of claim 13, further comprising a member server that is configured to facilitate communications between the data repository and the encryption engine.

15. The system of claim 14, wherein the member server comprises one or more tokens for identifying itself, the encryption engine being unlocked in response to determining that the member server is authorized to access the encryption engine based on the one or more tokens.

16. The system of claim 14, further comprising a data module that encrypts the data using a cryptographic protocol while the data is in transit between the encryption engine, the data repository, and the member server.

17. The system of claim 16, wherein the data repository comprises a database, the member server iterating over each row of the database and sending each row over a secure connection using the cryptographic protocol to the encryption engine as a continuous stream of data to be re-encrypted.

18. The system of claim 13, wherein the detected configuration changes comprise one or more of a change in network ports and a change in available backends used by the encryption engine.

19. The system of claim 13, wherein the lock module is further configured to use at least a subset of the plurality of keys received from a plurality of key holders to generate the master key, wherein a number of the subset is user configurable.

20. An apparatus comprising:
   means for receiving a request to decrypt encrypted data that is stored in a data repository, the encrypted data encrypted using a first encryption key; and
   means for unlocking an encryption engine in response to the request, the encryption engine unlocked using a master key that is generated based on combination of a plurality of keys held by a plurality of key holders;

means for decrypting the encrypted data using the encryption engine, the encrypted data decrypted using the first encryption key; and means for re-encrypting the decrypted data using the encryption engine, the decrypted data re-encrypted with a second encryption key that is different than the first encryption key, the re-encrypted data stored in the data repository;

means for detecting a change in a configuration of the encryption engine; and means for locking the encryption engine in response to the detected configuration change.

\* \* \* \* \*